United States Patent

[11] 3,618,916

[72] Inventor Jean Claude Giorgi
 Hellemmes, France
[21] Appl. No. 878,310
[22] Filed Nov. 20, 1969
[45] Patented Nov. 9, 1971
[73] Assignee Fives Lille-Cail
 Paris, France

[54] APPARATUS FOR PREHEATING SEPARATORS FOR PULVERIZED MATERIAL
 5 Claims, 2 Drawing Figs.
[52] U.S. Cl. ................................................. 263/32 R, 34/57 R
[51] Int. Cl. ................................................. F27b 7/20
[50] Field of Search ................................... 34/57 R; 263/21 A, 32 R

[56] References Cited
UNITED STATES PATENTS
2,493,911 1/1950 Brandt.......................... 34/57
3,116,054 12/1963 Bartmann.................... 263/32

Primary Examiner—John J. Camby
Attorney—Kurt Kelman

ABSTRACT: Apparatus for preheating pulverized material in the manufacture of cement includes a plurality of cyclone separators at least two of which are vertically spaced from each other. Air is passed between the separators in one direction and the particulate material is pneumatically conveyed in the opposite direction through a tube located within the air conduit.

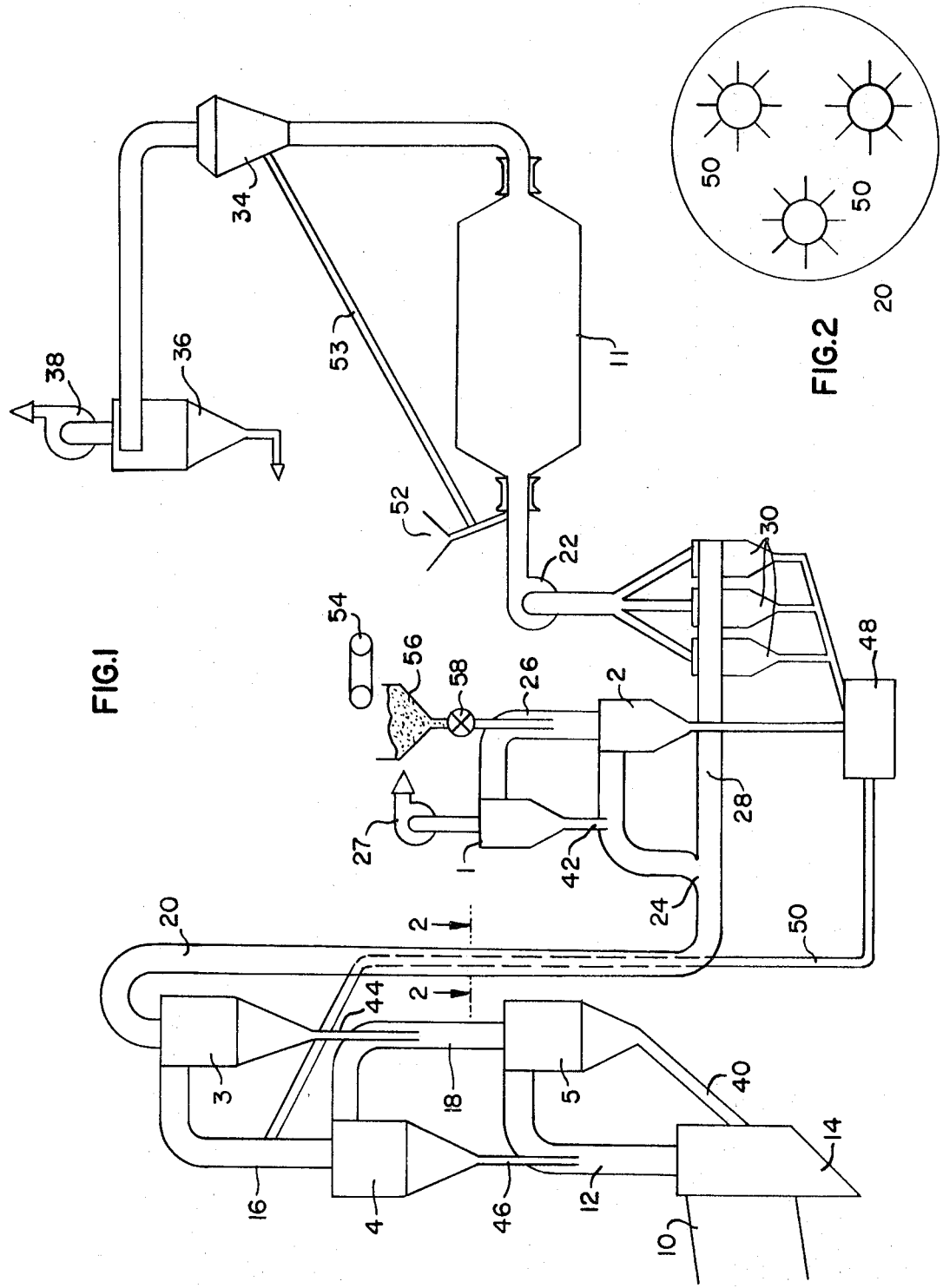

APPARATUS FOR PREHEATING SEPARATORS FOR PULVERIZED MATERIAL

The present invention relates to apparatus for preparing pulverized material for the manufacture of cement and, in particular, to the thermal treatment of such material in cyclone separators.

In general, materials employed in the manufacture of cement are first pulverized, separated into usable fractions, and then heated. The separating is accomplished by passing the material through a series of cyclone separators which are commonly arranged above the kiln so that the exhaust gases from the kiln or furnace may be passed through the separators to preheat the material.

In previous installations, it was most common to arrange the cyclone separators one above the other on a relatively higher tower. Recently, however, to reduce the height of the tower, its cost of erection and maintenance, the cyclone separators have been divided into at least two sets and arranged so that the separators of one set are located at a lower level than those of the second set. By dividing the separators into such sets, the overall height of the tower was reduced considerably. An additional expedient has been to stagger the positions of the cyclone separators so that they were not arranged directly one over the other but in a more or less side by side position.

While the above arrangement has succeeded in reducing the overall size of the tower and consequently the cost of installation of such equipment, a problem has arisen in that the heat-transfer characteristics and efficiency of the furnace exhaust gages in preheating the material has been somewhat reduced so that the effect on the ultimate product, the heat expenditure, and other economic factors have become quite noticeable.

It is an object of the present invention to provide an improved system for pulverizing material for the manufacture of cement.

It is another object of the present invention to provide a system for the pulverization of material in which the thermal input required to preheat the material is employed to greater efficiency.

It is another object of the present invention to provide a system for pulverizing materials which is more economical to install and operate.

It is a particular object of the present invention to provide a system for the pulverizing of materials for the manufacture of cement assuring an efficient heat exchange between the gases passing from the furnace or kiln through the cyclone separators and the materials to be preheated.

SUMMARY OF THE INVENTION

According to the present invention, a system for pulverizing materials for the manufacture of cement comprises cyclone separators arranged in two sets to pass pulverized material serially therethrough from an upstream end to a furnace located at the downstream end and to pass furnace exhaust gas serially therethrough countercurrently. The first of the sets of cyclones are arranged on a level below that at which the entrance of the initial cyclone of the second set is located, and a conduit is provided for passing the gas from the initial cyclone of the second set to the last cyclone of the first set. The pulverized material is conveyed through a pneumatic conveyor from the last cyclone in the first set to the first cyclone in the second set through tubular conveying means mounted within the gas conduit so that the heat of the gas may be transferred to the pulverized material while it is being pneumatically conveyed.

In the preferred form, the tubular members for conveying the pulverized material through the gas conduit are provided with fin means along their length which may be longitudinally, circularly or radially disposed so as to increase the heat transfer surface.

A full disclosure of the present invention together with an exposition of the advantages of the present invention will be apparent from the following description and from the accompanying drawing.

BRIEF DESCRIPTION OF THE DRAWING

In the accompanying drawing:

FIG. 1 is a schematic view of a pulverizing and heating installation employed in the manufacture of cement; and FIG. 2 is a sectional view taken along line 2—2 of FIG. 1 showing the gas conduit and the tubular member for pneumatically transporting the material therethrough.

DESCRIPTION OF THE INVENTION

The present invention is contained within a generally conventional system for pulverizing and feeding raw material to a furnace for the manufacture of cement. As seen in FIG. 1, the system comprises a first set of cyclone separators 1 and 2 and a second set of cyclone separators 3, 4 and 5. All of the cyclones 1-5 are simultaneously dry and separate the particles into usable fractions by the mixture of gas and particles. The separators are arranged in serial fashion between a rotating kiln 10 at the downstream end and rotating dryer-comminutor device 11 at the upstream end.

While five cyclone separators have been shown in the drawing, it will be apparent that the exact number chosen in any installation will depend upon a number of variables, such as the type of material to be preheated, the heat of the exhaust gases and other factors well known to those skilled in this art. Further, the form of the kiln and of the dryer comminutor as well as the other elements to be described herein have not been shown in great detail. All of these elements are conventional and, for the sake of brevity, have been only schematically depicted.

The cyclone separators 1-5 are all supported on suitable steel or reinforced concrete towers, as is conventional. The cyclones 1 and 2 of the first set are placed at a lower level, generally, than the cyclones 3, 4 and 5 of the second set and, in particular, so that the initial cyclone 3 of the second set is at a distinctly higher level than the final cyclone 2 of the first set. Additionally, as is suggested earlier herein, the cyclones 1 through 5 are staggered with respect to each other and slightly offset from common vertical axes.

A gas flow conduit 12 extends from the terminal flue 14 of the kiln 10 to the upper section of the most downstream separator 5 located in the second set of the cyclones. Similar conduits 16 and 18 connect the cyclones 3 and 4 and 4 and 5, respectively, for the flow of hot kiln exhaust gas serially therethrough from the downstream to the upstream end. A conduit 20 extends from the uppermost or most upstream cyclone 3, of the second set, vertically downward beneath the level of the cyclones 1 and 2, of the first set, where the conduit 20 divides into two branches 24 and 28.

The first of the branches 24 extends upwardly to connect with the upper section of the cyclone 2 from which a conduit 26 passes the gas to the cyclone 1. Cyclone 1 is provided with a ventilator 27 for expelling the gas and enhancing the flow from the kiln. The ventilator 27 expels the gas through a conventional dust filtration system and then to atmosphere.

The second branch conduit 28 is connected to the entrance of a multistage dust or particle filtration system 30 from which it passes to a ventilator 22 which feeds the gas to the dryer-comminutor 11 where it serves as the drying medium for the raw material pulverized therein. From the dryer communitor 11 the gas is passed through a filter unit 34 and then finally expelled to the atmosphere through a final cyclonic separator 36 and ventilator 38.

The most downstream cyclone 5 has an outlet 40 at its apex or lower end for passage of pulverized material directly into the interior of the kiln 10. Each of the cyclones 1, 3 and 4 have similar outlets 42, 44 and 46 which open into the associated adjacent conduits 24, 18 and 12, respectively, and permit the serial passage of pulverized material from each cyclone into the air stream entering the next succeeding downstream cyclone.

The apex outlet of the cyclone 2, however, exits to a pump 48 to which is also fed the material exiting from the multistage filtration unit 30. The pump 48 pneumatically conveys the pulverized material, so accumulated, through a tubular conveying member 50 into the conduit 16. The tubular conveyor 50 passes through the center of the vertical gas conduit 20 for a substantial distance and feeds the material conveyed therein directly into the air stream in the conduit 16.

Raw material which is to be pulverized is fed from a suitable source 52 directly into the dryer-comminutor 11 where it is simultaneously broken up by rotation and dried by the passage of gas therethrough from the ventilator 22. 56 The gases exiting from the dryer-comminutor 11 carry the formed particles to the separator 34 where particles above a predetermined size are removed and returned via a conduit 53 to the source 52 for a second or third passage through the dryer-comminutor 11. Properly sized particles are carried by the gas through the separator 34 to the final cyclone 36 where they are collected as the first batch of pulverized and dried material, and are then brought to a homogenation silo (not shown).

From the silo the properly sized particles are introduced through a dosimeter 54 or other weight conveyor, a hopper 56 and sieve 58 into conduit 26 between cyclones 2 and 1 where the material becomes entrained in the gas so as to begin its serial passage through the respective cyclones. The material mixes with the gases in the cyclone 1 where it is partially dried, thence passing through the outlet 42 into the branch conduit 24 where it flows into the cyclone 2. In a similar manner, the material passes from cyclone 2 through the pump 48 into the cyclone 3, 4 and 5 successively, where it is separated by the gaseous currents flowing therein and at the same time successively increased in temperature. In the final cyclone 5, the temperature of the particles may be made to reach as high as 800° C. Simultaneously, this material is submitted through its passage through the cyclone and the absorption of the heat to a decarbonation process.

The material separated from the current of gas in the final cyclone 5 is introduced directly into the kiln 10 through the conduit 40.

The gas exiting from the kiln 10 passes in its own closed circuit successively through the conduits 12, the cyclone 5, the conduits 18, the cyclone 4, the conduits 16 and cyclone 3. From the cyclone 3 the gases pass through the vertical conduit and are divided into two branch currents. The first of the branch currents is utilized in cyclones 1 and 2 to preheat the material there and is so dimensioned in caloric or heat content that it exits from the cyclone 1 through the ventilator 27 at an extremely low temperature, having exhausted its heat in heating the counterflowing material. The provision of a gas current of specific heat content, volume, flow speed, etc., is well known to those skilled in this art and need not be elaborated on. The other branch current of gas passes into the cyclonic filters 30 and then into the dryer-comminutor 11 where it acts to dry the material first comminuted, and after passage through the separator 34 is expelled to the atmosphere through the cyclone 36 and ventilator 38.

Turning to FIG. 2, the preferred form of the tubular conveyor for pneumatically passing the material through the vertical gas conduit 20 comprises a plurality of thin walled tubes having a plurality of vertically longitudinally disposed fins extending radially from the outer surfaces. In this manner, the pulverized material can be transported from the pump 48 directly to the conduit 16 in a plurality of small streams, each passing through the gas conduit 20, to absorb the heat of the gas-flowing countercurrent to it more efficiently. The fins 60 increase the heat exchange surfaces of tubes 50 and consequently enhance the heat-transfer characteristics of the system.

While it is is preferred to employ a plurality of small thin walled tubes, a single spiral tube, for example, having the proper wall dimensions and other efficient heat-transfer characteristics may be employed. The dimensions and shape of the tube will depend upon such factors as the height of the vertical conduit 20, the temperature of the flue gas from kiln 10, the size of the pulverized material, and the rate of its forward movement. The fins 60 are shown as longitudinal radial projections. They, too, may be varied and may, for example, be helical, spiral or circular projections, in any manner, which would enhance the heat-transfer characteristics of the outer surface of the tube.

In placing the tubes 50 through the vertically extending conduit 20 while passing the material from the cyclone 2 through the conduit 16, not only is the cooling of the pulverized material avoided but the material continues to be heated during its conveyance by aid of the gas extending from the cyclone 3. In the prior installations, the material transferred between the lower set of cyclones and the upper set, was always subject to a cooling influence, necessitating the reheating of the material in midstream. Thus, according to the present invention a more complete utilization of the exhaust gases can be made, obtaining a better thermal output of the installation, and a more economical operation and lower cost of investment.

Of course, the particular type of cyclone separator may be replaced with an equivalent form of separator not employing cyclonic means.

It is quite evident that the present invention is not only applicable to the installation described but also may be utilized in other systems where devices are employed to simultaneously preheat the materials contained therein. Since numerous modifications and changes have been indicated herein it is to be understood that the present disclosure is illustrative only of the present invention, and not limiting of it.

What is claimed:

1. A system for preheating pulverized material conveyed between a comminutor and a heating furnace, comprising a plurality of air particle separators arranged to pass particulate material successively through each separator from an upstream end to a downstream end, and to pass exhaust gas from the furnace successively through each separator from the downstream end to the upstream end, said air particle separators being divided into an upstream set and a downstream set, the serially adjacent separators of each of said respective sets being vertically spaced from each other, the upstream set of separators being positioned below the level of at least one of the separators of the downstream set, a substantially vertical pipe extending between said one separator of the downstream set and the upstream set of separators for passing the exhaust gas therebetween within the said pipe, and conveyor means for passing the particulate material therebetween, the conveyor means comprising an elongated tube provided with fins projecting from the outer surface thereof and passing through the vertical pipe, and means for pneumatically moving the particulate material through the tube whereby the particulate material absorbs heat from the gas flowing in the vertical pipe.

2. The system according to claim 1, wherein said fins extend longitudinally of said tube.

3. The system according to claim 1, wherein said fins are helically disposed about the outer surface.

4. The system according to claim 1, wherein said fins are circular.

5. A system for preheating pulverized material conveyed to a heating furnace, comprising a plurality of cyclone separators arranged to pass particulate material successively through each separator from an upstream to a downstream end, and to pass exhaust gas from the furnace successively through each separator from the downstream end to the upstream end, the cyclone separators being divided into an upstream set and a downstream set arranged side by side, the serially adjacent separators of each of the sets being vertically spaced from each other and an upper separator of the downstream set being positioned substantially higher, than a lower separator of the upstream set, separator substantially vertical exhaust gas conduit extending between the upper separator of the downstream set and the lower separator of the upstream set, an elongated tube mounted within the conduit, and means for pneumatically moving the particulate material through the elongated tube from a upstream set of separators to the upper separator of the downstream set.